(12) United States Patent
Guillot et al.

(10) Patent No.: US 12,014,867 B2
(45) Date of Patent: Jun. 18, 2024

(54) CONNECTION SYSTEM FOR EXCHANGING ELECTRICAL SIGNALS WITH MAGNETIC SYMMETRICAL CONNECTORS

(71) Applicant: SAFRAN ELECTRONICS & DEFENSE, Paris (FR)

(72) Inventors: François Guillot, Moissy-Cramayel (FR); Patrice Chetanneau, Moissy-Cramayel (FR); Pascal Spoor, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 35 days.

(21) Appl. No.: 17/999,181

(22) PCT Filed: May 20, 2021

(86) PCT No.: PCT/FR2021/050924
§ 371 (c)(1),
(2) Date: Nov. 17, 2022

(87) PCT Pub. No.: WO2021/234320
PCT Pub. Date: Nov. 25, 2021

(65) Prior Publication Data
US 2023/0245819 A1    Aug. 3, 2023

(30) Foreign Application Priority Data

May 20, 2020    (FR) ...................................... 2005324

(51) Int. Cl.
| | |
|---|---|
| *H01F 38/14* | (2006.01) |
| *H01F 27/255* | (2006.01) |
| *H01F 27/28* | (2006.01) |
| *H01F 27/36* | (2006.01) |
| *H01R 13/62* | (2006.01) |
| *H04B 5/26* | (2024.01) |

(52) U.S. Cl.
CPC ........... *H01F 38/14* (2013.01); *H01F 27/255* (2013.01); *H01F 27/2804* (2013.01);
(Continued)

(58) Field of Classification Search
CPC ........ H01F 27/06; H01F 27/255; H01F 27/28; H01F 27/2804; H01F 27/288;
(Continued)

(56) References Cited

U.S. PATENT DOCUMENTS

| | | | |
|---|---|---|---|
| 4,038,625 A | 7/1977 | Tompkins et al. | |
| 5,229,652 A | 7/1993 | Hough | |
| 2003/0030534 A1* | 2/2003 | Gu | H01F 27/2885 336/221 |
| 2014/0347159 A1* | 11/2014 | Zuo | H01F 27/24 336/84 C |
| 2019/0122814 A1* | 4/2019 | Hung | H01F 27/24 |

FOREIGN PATENT DOCUMENTS

EP    3 249 758 A1    11/2017

OTHER PUBLICATIONS

English translation of Written Opinion mailed Sep. 15, 2021, issued in corresponding International Application No. PCT/FR2021/050924, filed May 20, 2021, 6 pages.
(Continued)

*Primary Examiner* — Levi Gannon
(74) *Attorney, Agent, or Firm* — CHRISTENSEN O'CONNOR JOHNSON KINDNESS PLLC (57) ABSTRACT

A connection system for exchanging electrical signals includes a first symmetrical connector and a second symmetrical connector. Each symmetrical connector has at least one magnetic core provided with at least one turn. The symmetrical connectors are produced in a substrate made of insulating material so as to form a half of a coupling transformer. At least one half of the coupling transformer of each connector is arranged opposite one another so as to be able to exchange a magnetic flux. The electrical signals are emitted by the first connector in the form of a magnetic flux, and the second connector generates the electrical signals on receiving the magnetic flux.

9 Claims, 7 Drawing Sheets

(52) U.S. Cl.
CPC ....... *H01F 27/2885* (2013.01); *H01F 27/363* (2020.08); *H01R 13/62* (2013.01); *H04B 5/266* (2024.01); *H01F 2027/2819* (2013.01); *H01F 2038/143* (2013.01)

(58) Field of Classification Search
CPC ...... H01F 27/2885; H01F 27/34; H01F 27/36; H01F 27/363; H01F 38/14; H01F 2027/065; H01F 2027/2819; H01F 2038/143; H01R 13/62; H02J 50/10; H04B 5/00; H04B 5/24; H04B 5/26; H04B 5/266
See application file for complete search history.

(56) References Cited

OTHER PUBLICATIONS

International Preliminary Report on Patentability mailed Nov. 17, 2022, issued in corresponding International Application No. PCT/FR2021/050924, filed May 20, 2021, 8 pages.
International Search Report mailed Sep. 15, 2021, issued in corresponding International Application No. PCT/FR2021/050924, filed May 20, 2021, 5 pages.
Written Opinion mailed Sep. 15, 2021, issued in corresponding International Application No. PCT/FR2021/050924, filed May 20, 2021, 7 pages.

* cited by examiner

CONNECTION SYSTEM FOR EXCHANGING ELECTRICAL SIGNALS WITH MAGNETIC SYMMETRICAL CONNECTORS

TECHNICAL FIELD

The technical field of the invention is the connector technology between computers, in particular for computers on-board an aircraft.

STATE OF THE PRIOR ART

The conventional connector technology, used in the context of computers on-board an aircraft, in particular of the ARINC 600 type, is generally very expensive, too limited in bandwidth (bit rate of Quadrax contacts), limited in density and not sufficiently resistant to lightning and BCI ("Bulk Current Injection") environments. An evolution of the current connector technology, which can be considered to increase the bandwidth, consists in increasing the number of contacts. Nevertheless, this would have the effect of increasing the insertion or extraction force to a too high level.

Moreover, such an evolution does not solve the problem of sensitivity to lightning and BCI environments.

Finally, the evolutions of the conventional connector technology pose a problem of controlling the performance of galvanic isolation transformers of avionics digital buses (Ethernet or ARINC 664).

DISCLOSURE OF THE INVENTION

The invention relates to a connection system for exchanging electrical signals, comprising a first symmetrical connector and a second symmetrical connector, each symmetrical connector comprising at least one magnetic core provided with at least one turn, the symmetrical connectors being produced in a substrate made of insulating material, so as to form a half of a coupling transformer, at least one half of a coupling transformer of each connector being disposed opposite to each other so as to be able to exchange a magnetic flux, the electrical signals being emitted by a first connector in the form of a magnetic flux, the second connector generating the electrical signals on receiving the magnetic flux, a capacitive electrical shielding layer is disposed on the surface of the insulating substrate of each symmetrical connector, openings being formed in the shielding layer so as not to come into contact with the magnetic cores and so as to allow the passage of magnetic fluxes, the shielding layer being open between the different portions of the same magnetic core flush with the surface of a symmetrical connector so as not to create a parasitic turn creating a short circuit of the coupling transformer.

At least one of the symmetrical connectors can be provided with at least one elastic connecting element allowing generating a controlled bearing force between the symmetrical connectors, the connection between the symmetrical connector provided with such an elastic element and the rest of the electrical circuit then being of the flexible type so as to enable a position deflection of the symmetrical connector.

A protective skirt can be disposed around at least one of the symmetrical connectors so as to protect it when it is not connected to the other symmetrical connector.

An air gap can be formed between the magnetic cores disposed opposite to each other.

The magnetic cores can be produced by screen printing an assembly of magnetic powder bonded by an epoxy.

The magnetic powder can be of formula $Y_3Fe_5O_{12}$.

The magnetic core can be tripod-shaped, C-shaped or E-shaped.

Each connector can comprise a free surface, the connectors being disposed opposite to each other via the respective free surfaces thereof. The surface of the turns can be parallel to the free surface of the connector when the magnetic core is tripod-shaped, the surface of the turns being perpendicular to the free surface of the connector when the magnetic core is C-shaped or E-shaped.

The invention also relates to an aircraft comprising a connection system as described above, in which a first connector is connected to an on-board computer, the second connector being secured to the aircraft and connected to a communication harness of the aircraft.

BRIEF DESCRIPTION OF THE DRAWINGS

Other aims, features and advantages of the invention will appear on reading the following description, given solely by way of non-limiting example, and made with reference to the appended drawings in which.

DETAILED DESCRIPTION

The connection system, according to the invention, allows in particular minimising the insertion and disinsertion force, and reducing the sensitivity to lightning and to BCI environments.

In order to meet these two needs simultaneously, the connection and transfer system according to the invention ensures an information transfer via controlled and highly localised magnetic fluxes. The dielectric insulation is thus maximised.

In practice, the male/female connectors of the state of the art are replaced by two symmetrical printed circuits, one connected to the on-board computer, the other on the chair carrying the on-board computer. These two printed circuits come into contact opposite to each other and each has, towards each other, a half transformer magnetic circuit. These magnetic circuits are integrated into the printed circuit. In addition, in order to flow the BCI currents towards the metal structure of the computer, copper insulation layers are produced on a PCB type insulating substrate, as a shielding between the worlds internal/external to the computer, while forming the passage of the magnetic fluxes and without creating a short circuit on the transformers.

Figure 1:
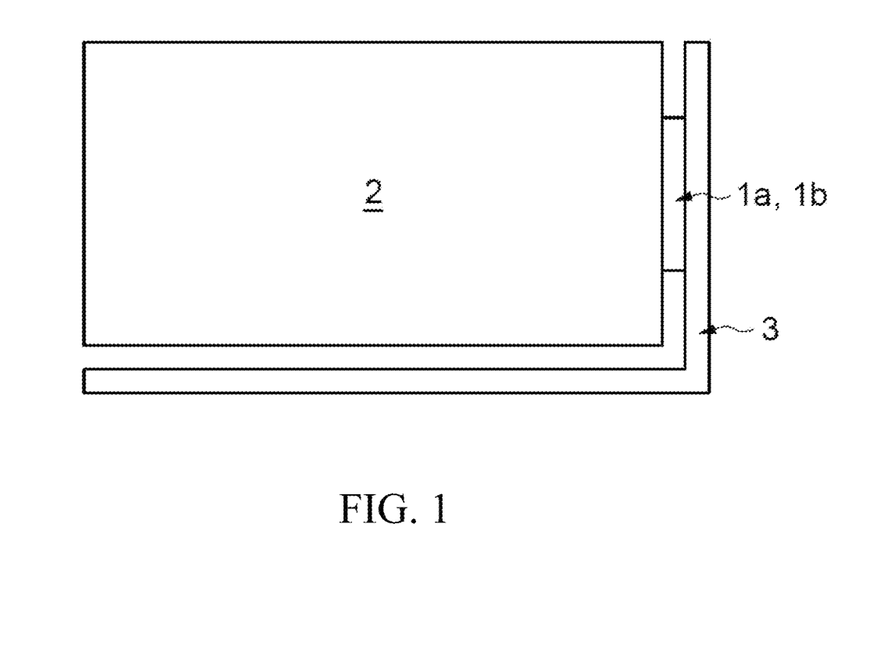
FIG. 1 illustrates an overall view of the connection system.

An example of context for mounting a connection system in the case of ARINC 600 type on-board computers is represented in FIG. 1.

As represented, the connection system comprises two symmetrical connectors 1a, 1b, one connected to the on-board computer 2, the other to the seat 3 secured to the plane and connected to a communication harness.

Figure 2:
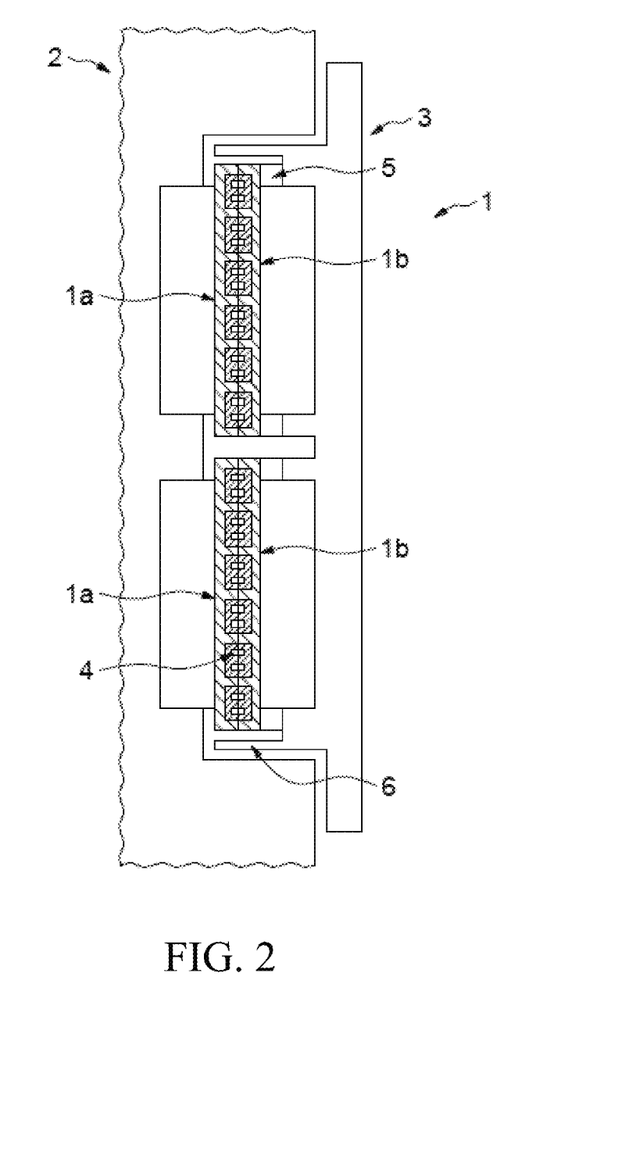
FIG. 2 illustrates a sectional view of the symmetrical connectors of the connection system according to the invention.

In FIG. 2, there is represented an overall view of the connection system 1, with two first connectors 1a and two second connectors 1b, connected respectively to the on-board computer 2 and to the chair 3.

The person skilled in the art will understand that the number of pairs of symmetrical connectors 1a, 1b is to be adapted depending on the needs.

Each symmetrical connector 1a, 1b comprises at least one half of a coupling transformer 4 disposed opposite to a half of a coupling transformer 4 on the opposite symmetrical connector. In FIG. 2, twelve coupling transformer halves have been illustrated on each symmetrical connector 1a, 1b. Herein again, the person skilled in the art will understand that the number of coupling transformer halves 4 per symmetrical connector 1a, 1b is to be adapted depending on the needs, in particular of bandwidth, on the condition that at least one coupling transformer is formed by facing two coupling transformer halves each disposed on a symmetrical connector 1a, 1b.

At least one of the symmetrical connectors 1a, 1b is provided with at least one elastic connecting element 5 allowing generating a controlled bearing force between the symmetrical connectors 1a, 1b. The connection between the symmetrical connector provided with such an elastic element 5 and the rest of the electrical circuit is then of the flexible type so as to enable a position deflection of the symmetrical connector.

This elastic connecting element 5 is made of elastomer, for example of the RTV ("room-temperature-vulcanising silicone") silicone type, in particular of reference 20DIDC of the VIBRACHOC or GAMMA brands in a thickness of about 6 mm. Each elastic connecting element 5 is glued by a glue adapted to RTV silicones.

In some embodiments, a protective skirt 6 is disposed around the second connector 1b so as to protect it when it is not connected. In some embodiments, protective skirt 6 is disposed around the first connectors 1a. In other embodiments, each symmetrical connector 1a, 1b is provided with a protective skirt 6, one of the protective skirts being arranged so as to be disposed around the other skirt when the symmetrical connectors 1a, 1b are connected.

Figure 3:
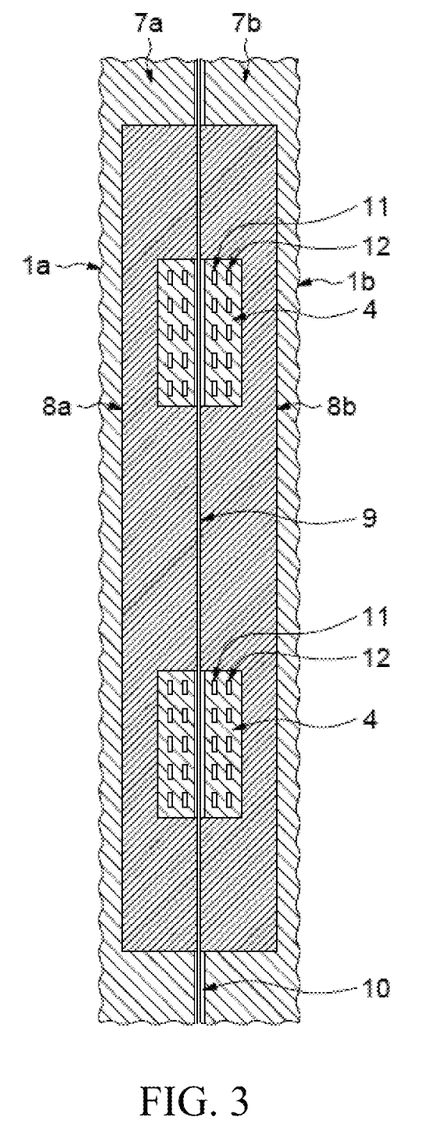
FIG. 3 illustrates an enlargement of the sectional view of a portion of two symmetrical connectors of the connection system.
Figure 5:
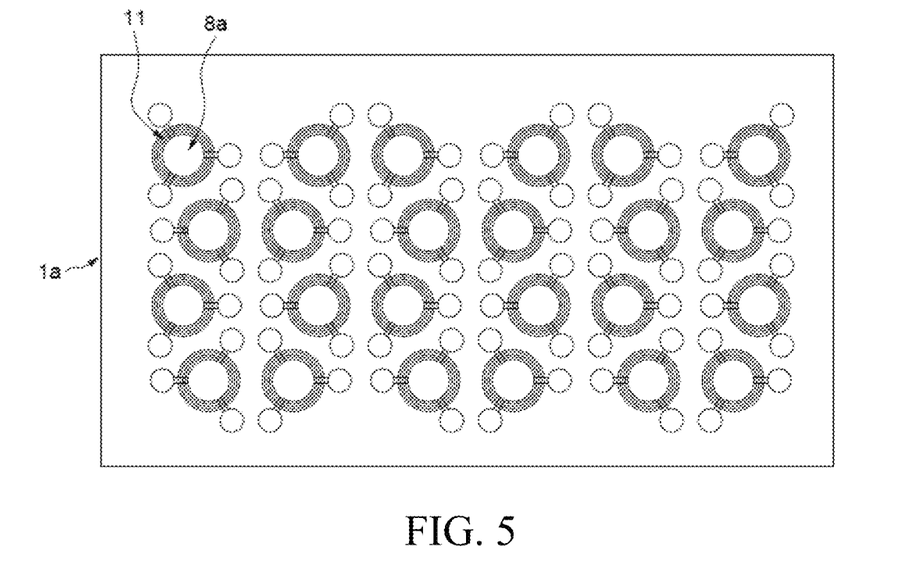
FIG. 5 illustrates a first view of the surface of a connector of the connection system.

FIG. 3 is an enlarged view of a portion of two symmetrical connectors 1a, 1b. A symmetrical connector 1a, 1b comprises at least one half of a coupling transformer 4 each provided with at least two superimposed windings produced in an insulating substrate 7a, 7b, in particular of the PCB type. The windings are surrounded by a magnetic core 8a, 8b. The magnetic core 8a, 8b can have a tripod configuration as illustrated in FIG. 5, described below.

The symmetrical connectors 1a, 1b are disposed such that a minimum air gap 9 is formed between the magnetic cores 8a, 8b disposed opposite to each other.

A copper shielding layer 10 is disposed on the surface of the insulating substrate 7a, 7b of each symmetrical connector 1a, 1b. This therefore implies that the shielding layer 10 does not come into contact with the magnetic cores 8a, 8b.

Figure 4:
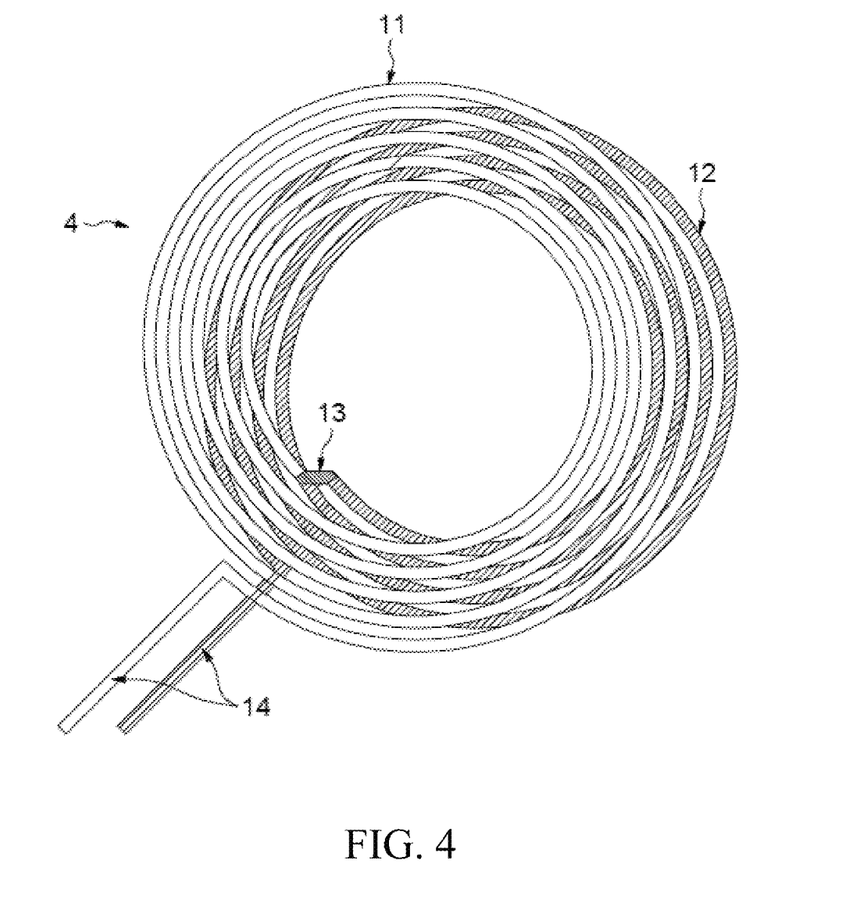
FIG. 4 illustrates seeing a winding of a half of a coupling transformer of the connection system.

FIG. 4 illustrates a winding of a half of a coupling transformer 4. The winding comprises two turns 11, 12 which are connected to each other by a connection 13 made via through the insulating substrate, the turns 11, 12 being each linked to an input/output connection 14.

The turns 11, 12 are aligned so as to generate a magnetic flux perpendicular to the surface of the symmetrical connector 1a, 1b.

Such a winding is made on each of the faces of a PCB-type insulating substrate.

FIG. 5 is a view of the surface of a first symmetrical connector 1a, in which the shielding layer 10 is not represented. The different turns 11 of a symmetrical connector 1a are disposed such that each turn surrounds the central element of the tripod-shaped magnetic core 8a. The second corresponding symmetrical connector 1b would have the same arrangement.

The magnetic cores are produced by screen printing an assembly of magnetic powder ($Y_3Fe_5O_{12}$) bonded by an appropriate epoxy resin. This solution allows guaranteeing that the magnetic core will form a homogeneous and robust "whole" with the insulating substrate.

Figure 6:
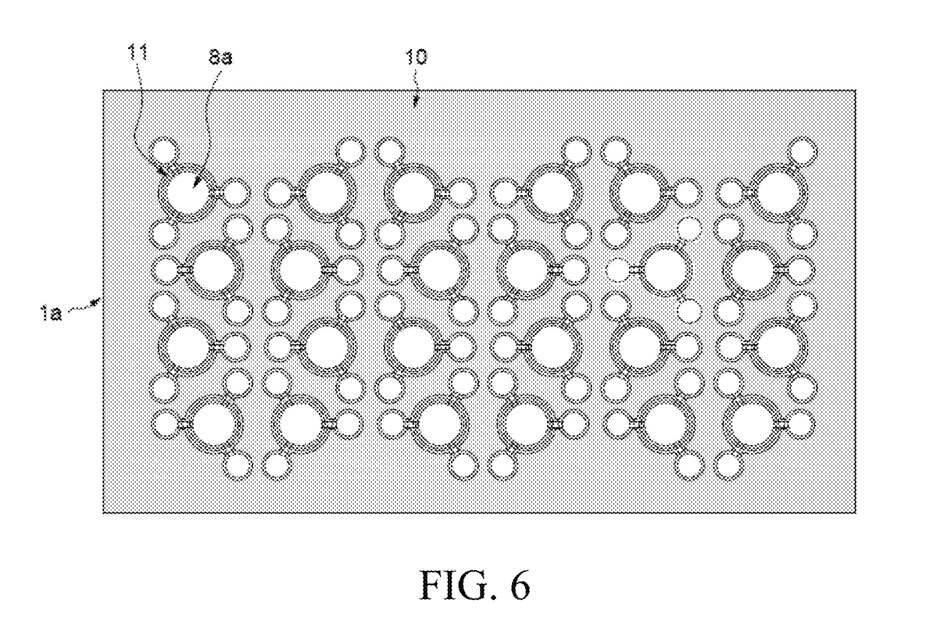
FIG. 6 illustrates a second view of the surface of a connector of the connection system.

FIG. 6 is a view of the surface of the symmetrical connector 1a, 1b corresponding to FIG. 5, in which the shielding layer 10 is now represented.

The shielding layer 10 forms a capacitive electrical shield between the primaries and secondaries of the transformers. The shielding layer 10 is connected to the mechanical ground of the computer. Its function is to propose a privileged path to high frequency currents injected in a common mode (BCI), The shielding layer 10, made of copper, is pierced in line with the magnetic cores 8a, 8b to allow the passage of the magnetic fluxes. It is also open between the central core and the secondary cores so as not to create a parasitic turn creating a short circuit on the transformer. By design (topology of the design of the shielding layer), the resonance frequency of this shielding zone will be much higher than the fundamental frequency of the signals to be conveyed by each transformer. The width of the openings allows choosing this resonance frequency.

Figure 7:
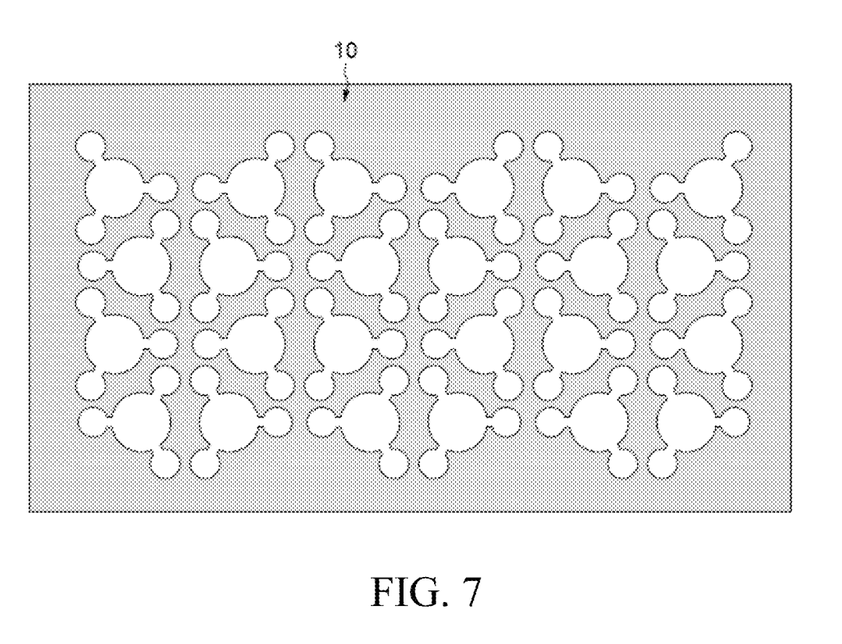
FIG. 7 illustrates a view of the shielding layer on the surface of a connector of the connection system.

FIG. 7 is a view of the shielding layer 10 shown in FIG. 6.

The second corresponding symmetrical connector 1b has the same arrangement.

Alternatively, the windings can be produced around a magnetic core, the magnetic core being C-shaped or E-shaped.

Figure 8:
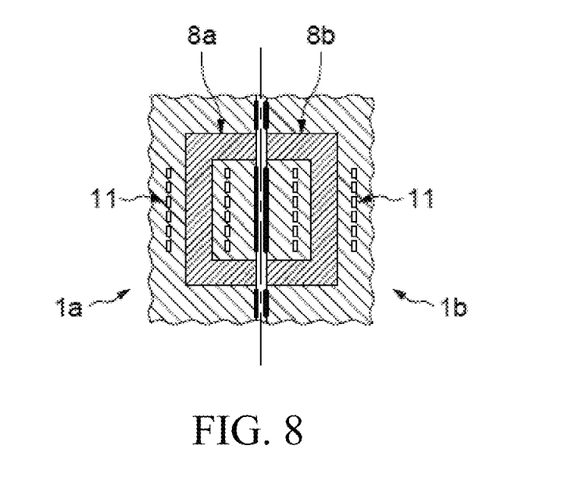
FIG. 8 illustrates an overall sectional view of the connection system according to the invention according to a second embodiment.

FIG. 8 illustrates such an embodiment in which windings are disposed around a C-shaped magnetic core. The turns are then substantially perpendicular to the free surface of the connector.

Figure 9:
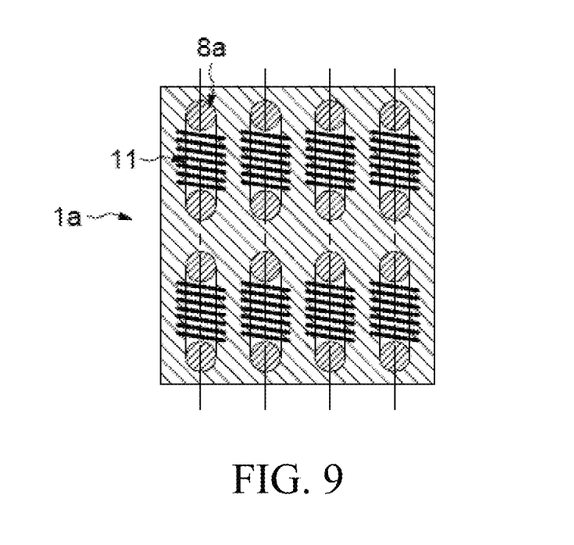
FIG. 9 illustrates a first view of the surface of a connector of the connection system according to a second embodiment.

FIG. 9 illustrates the free surface of a first symmetrical connector 1a similarly to FIG. 5. The shielding layer 10 is not represented. As shown, the ends of the C-shaped magnetic cores 8a appear in this surface. The turns 11 formed by the windings are perpendicular to the core and the free surface.

Figure 10:
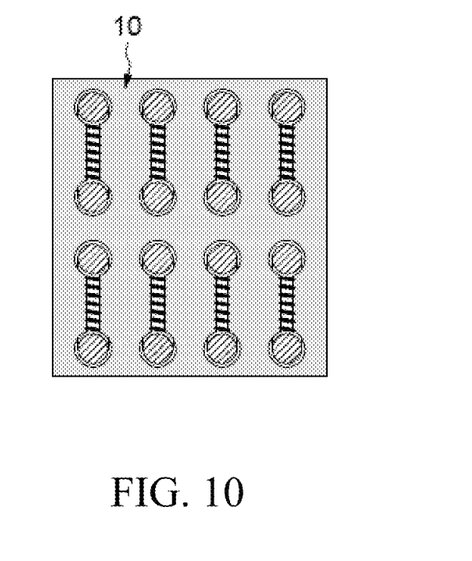
FIG. 10 illustrates a second view of the surface of a connector of the connection system according to a second embodiment.

FIG. 10 illustrates the free surface of the first symmetrical connector 1a illustrated in FIG. 9, in which the shielding layer 10 is represented. As in the first embodiment, the copper shielding layer is provided only on the insulating substrate such that a cut is made at the outcrop of the magnetic core as well as between two outcrops of the same electrical core so as not to block the magnetic flux.

It should be noted that the protective layers are described above as being made of copper, Nevertheless, the person skilled in the art can use any other adapted material to replace copper.

The invention claimed is:

1. A connection system for exchanging electrical signals, comprising a first symmetrical connector and a second symmetrical connector, each symmetrical connector comprising at least one magnetic core provided with at least one turn, the symmetrical connectors being produced in a substrate made of insulating material, so as to form a half of a coupling transformer, at least one half of a coupling transformer of each connector being disposed opposite to each other so as to exchange a magnetic flux, the electrical signals being emitted by the first connector in the form of a magnetic flux, the second connector generating the electrical signals on receiving the magnetic flux, wherein a capacitive electrical shielding layer is disposed on a surface of the insulating substrate of each symmetrical connector, openings being formed in the shielding layer so as not to come into contact with the magnetic cores and so as to allow the passage of magnetic fluxes, the shielding layer being open between the different portions of the same magnetic core flush with the surface of a symmetrical connector so as not to create a parasitic turn creating a short circuit of the coupling transformer.

2. The connection system according to claim 1, wherein at least one of the symmetrical connectors is provided with at least one elastic connecting element allowing generating a controlled bearing force between the symmetrical connectors, the connection between the symmetrical connector provided with such an elastic element and the rest of the electrical circuit being then of the flexible type so as to enable a position deflection of the symmetrical connector.

3. The connection system according to claim 2, wherein a protective skirt is disposed around at least one of the symmetrical connectors so as to protect it when it is not connected to the other symmetrical connector.

4. The connection system according to claim 1, wherein an air gap is formed between the magnetic cores disposed opposite to each other.

5. The connection system according to claim 1, wherein the magnetic cores are produced by screen printing an assembly of magnetic powder bonded by an epoxy resin.

6. The connection system according to claim 5, wherein the magnetic powder is of formula $Y_3Fe_5O_{12}$.

7. The connection system according to claim 1, wherein the magnetic core is tripod-shaped, C-shaped or E-shaped.

8. The connection system according to claim 7, wherein each connector comprises a free surface, the connectors being disposed opposite to each other via the respective free surfaces thereof, a surface of the turns being parallel to the free surface of the connector when the magnetic core is tripod-shaped, the surface of the turns being perpendicular to the free surface of the connector when the magnetic core is C-shaped or E-shaped.

9. An aircraft comprising a connection system according to claim 1, wherein the first connector is connected to an on-board computer, the second connector being secured to the aircraft and connected to a communication harness of the aircraft.

* * * * *